May 6, 1952 K. F. SPALDING 2,595,421
PLASTIC-SEALING MACHINE
Filed April 19, 1950 3 Sheets-Sheet 1
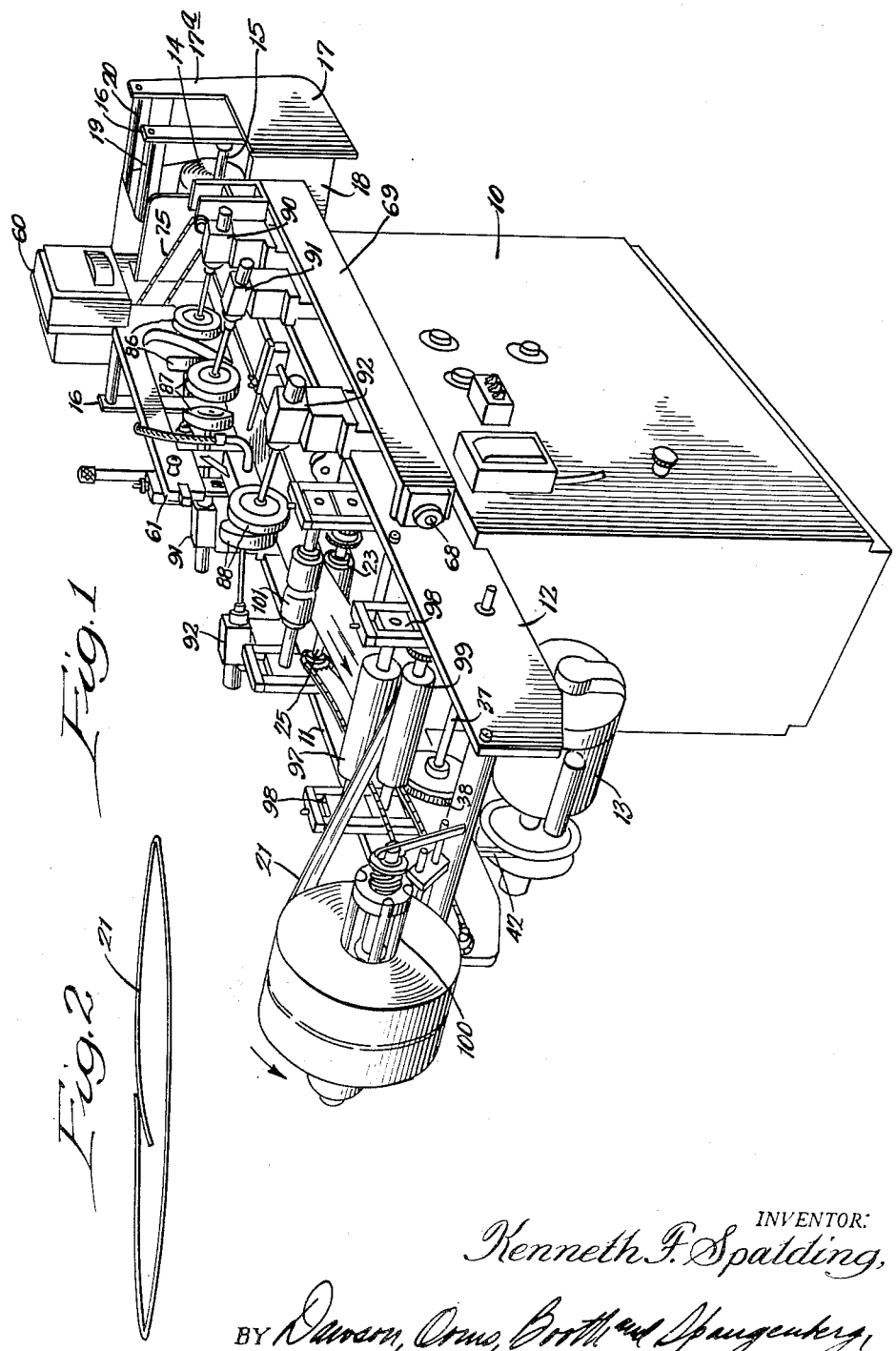
INVENTOR:
Kenneth F. Spalding,
BY Dawson, Ormo, Booth and Spangenberg,
ATTORNEYS May 6, 1952  K. F. SPALDING  2,595,421
PLASTIC-SEALING MACHINE
Filed April 19, 1950  3 Sheets-Sheet 2
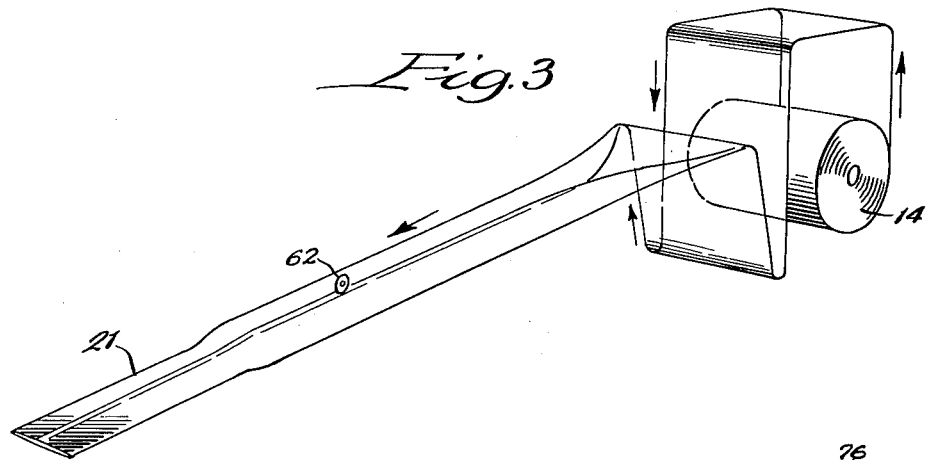
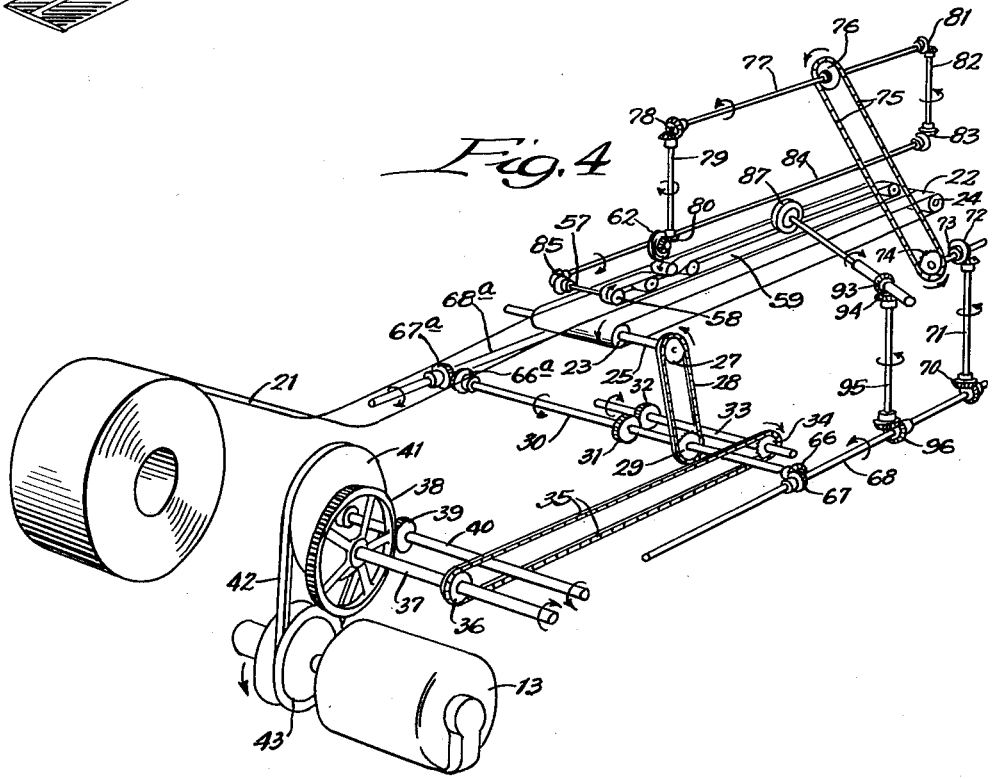
INVENTOR:
Kenneth F. Spalding,
BY Dawson, Orms, Broth and Spangenberg,
ATTORNEYS.

May 6, 1952
K. F. SPALDING
2,595,421
PLASTIC-SEALING MACHINE
Filed April 19, 1950
3 Sheets-Sheet 3
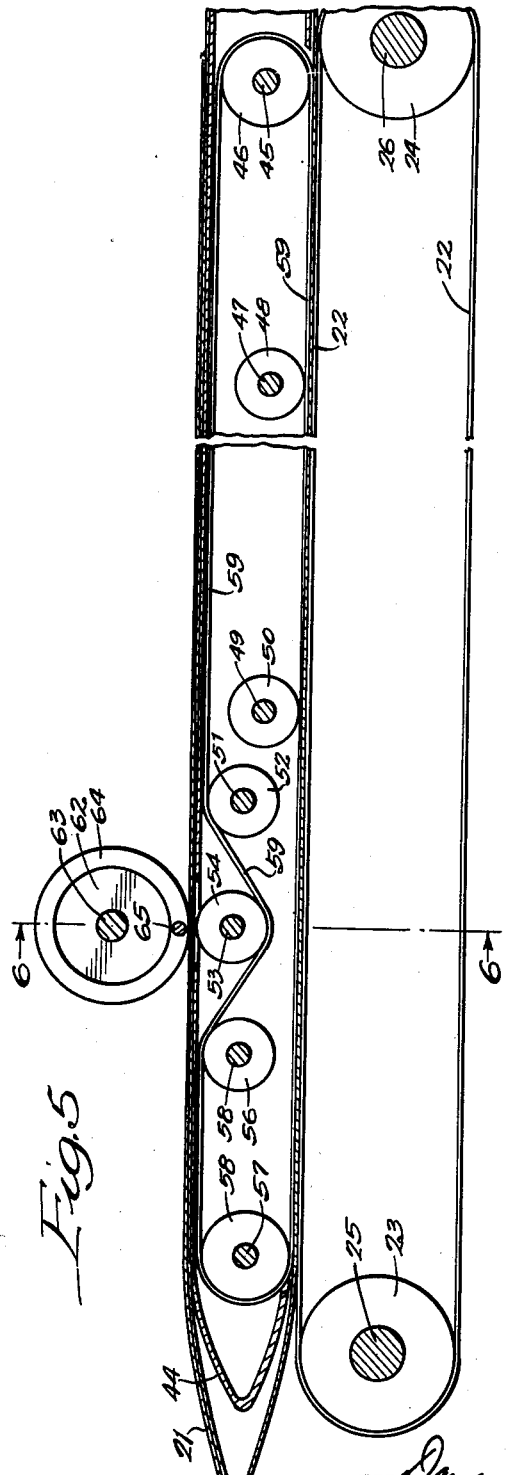
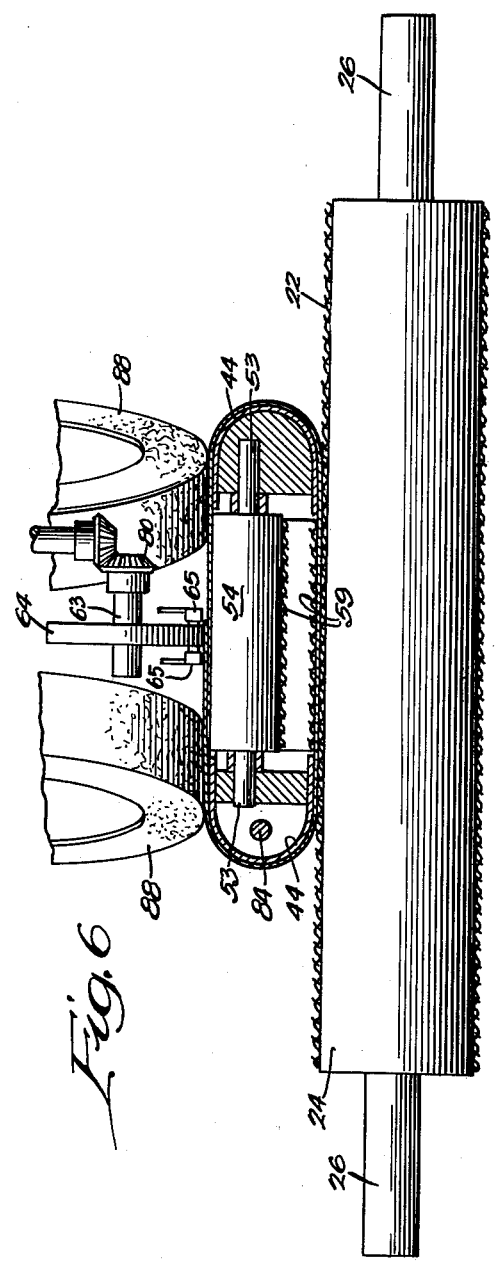
INVENTOR:
Kenneth F. Spalding,
BY Dawson, Ooms, Booth and Spangenberg,
ATTORNEYS.

Patented May 6, 1952

2,595,421

UNITED STATES PATENT OFFICE 2,595,421

PLASTIC-SEALING MACHINE

Kenneth F. Spalding, Lodi, N. J., assignor to William F. Stahl, Kenilworth, Ill.

Application April 19, 1950, Serial No. 156,781

2 Claims. (Cl. 154—1.8)

This invention relates to plastic sealing machines, and in particular it is concerned with a machine having novel and effective apparatus for guiding and feeding, to and past a sealing position, the plastic sheet material of the "stretchy" plastics such as polyethylene, vinylidene chloride, and the other plastics of the vinyl family.

Mass production of plastic bags, envelopes, and other containers formed from thin sheets of the plastics which are inclined to stretch, has in the past represented a difficult and wellnigh insoluble problem, for the reason that the requirements of automatic feed seemed incompatible with the absolute necessity of avoiding the development, within the plastic material, of internal stresses which would alter its shape, cause it to develop bulges, and invariably foul the feeding machinery.

An object of the present invention is to provide a plastic sealing machine in which novel means are employed to feed successfully to and past a feeding position thin plastic sheets of the type which are inclined to stretch under internal stresses.

Another object of the present invention is to provide a novel plastic sealing machine wherein the plastic to be sealed is guided into the proper shape for sealing, carried past the sealing position, and transmitted to a spool or to the next processing step without the introduction into any part of the plastic material of internal stresses tending to stretch the same out of shape.

Another object of the present invention is to provide a plastic sealing machine in which "toed-in" top rollers are made to cooperate with a plurality of rough-textured belts to guide stretchable plastic into the proper position for sealing without creating internal stresses therein.

Other objects and advantages of the invention will appear as the specification proceeds.

I have illustrated in the appended drawing a typical embodiment of my invention. Of the figures in the drawing, Fig. 1 is a perspective view of a sealing machine embodying my invention; Fig. 2 is a sectional view through a piece of plastic stock as it appears after it has been formed into the desired shape and provided with a longitudinal seam seal by the machine of Fig. 1; Fig. 3 is a phantom or exploded view of the plastic stock shown in the process of passing through the machine of Fig. 1, the machine being absent from the drawing, except for the rotary sealing wheel, to facilitate an understanding of the path taken by the plastic stock; Fig. 4 is an exploded, semi-diagrammatic view in perspective showing specifically the drive mechanism by which the various moving parts of my invention are actuated; Fig. 5 is a longitudinal sectional view of the mandrel on which the plastic sheet stock is shaped and sealed; and Fig. 6 is a transverse sectional view of the mandrel and associated equipment, taken along the line 6—6 of Fig. 5.

Referring now to the drawing, the illustrated embodiment of my invention is mounted on a massive foundation member 10, which carries a pair of longitudinal bars 11 and 12, which serve as a frame for most of the moving parts of my machine. The source of energy for actuating the moving parts is an electric motor 13, which is supplied with current from a suitable source (not shown).

In the illustrated form of the invention, plastic sheet stock is taken from a stock spool 14 mounted on an axle 15, which is journaled in a pair of uprights 16. Uprights 16 are bolted or welded to a pair of plates 17 joined by a transverse plate 18. Transverse plate 18 is bolted, welded, or otherwise secured, to the rear faces of bars 11 and 12.

The upper ends of upright 16 carry a transverse idler rod 19, and another idler rod 20 is carried between the upper ends of a second pair of uprights 17a which are formed integrally with plate 17 and which rise from the rearmost portion thereof. The plastic sheet stock 21 from roll 14 passes over the idler bars 19 and 20, under the lower edge of transverse plate 18, which functions as another idler device, and on to the upper surface of belt 22.

Belt 22 is a wide, relatively taut endless belt formed of a non-stretching, relatively rough-textured material. It is carried by a pair of rollers denoted, respectively, 23 and 24; rollers 23 and 24 are mounted on shafts 25 and 26, which are journaled into suitable bearings carried by side bars 11 and 12.

As may best be noted from Fig. 4, shaft 25 carries a sprocket 27 which is coupled by a sprocket chain 28 to sprocket 29 on transverse shaft 30. Transverse shaft 30, in turn, carries a gear 31 which is in mesh with a gear 32 on shaft 33. Shaft 33 has also gear 34, coupled by a sprocket chain 35 to a sprocket 36 on shaft 37. Shaft 37 carries a large gear 38 which is in mesh with a small gear 39 keyed to shaft 40. Shaft 40 has a large pulley wheel 41 which is belt-driven through belt 42 by pulley 43, mounted directly on shaft of motor 13. While Fig. 4 does not show side bars 11 and 12 or the interior of foundation 10, it will be understood that the various shafts shown therein are suitably journaled into bearings which are carried by the frame structure.

As may be seen in Figs. 1 and 4, the broad, flat upper surface of belt 22 serves as a sort of moving table which carries and advances the plastic sheet stock.

As the sheet stock 21 passes on to the upper surface of belt 22, it is folded as shown in Fig. 3 around a mandrel member 44, secured to the frame at its rearmost end and resting generally on belt 22. Mandrel 44 is hollow and open along its under surface, as may be best seen in Fig. 6. Mounted on suitable bearings formed in the interior of mandrel 44 are a series of shafts which carry belt rollers; shaft 45, at the rearmost portion of the mandrel 44, carries roller 46; shaft 47 carries roller 48; shaft 49 carries roller 50; shaft 51 carries roller 52; shaft 53 carries roller 54; shaft 55 carries roller 56; and shaft 57 carries roller 58, the various shafts and rollers being mentioned in advancing order from rear to front of mandrel 44, as seen best in Fig. 5.

As the plastic stock passes over the rear portion of mandrel 44, it is folded by conventional guide members (not shown) over the mandrel so as to make the edges of the plastic sheet overlap along the mid-line of the upper side of mandrel 44, as may best be seen from Figs. 3 and 6.

An endless belt 59 is mounted within mandrel 44; it is secured by the terminal rollers 58 and 46; it passes over roller 56, under roller 54, and over roller 52. Rollers 50 and 48 are mounted near the lowermost portion of mandrel 44, so that their surfaces, pressing on belt 59, help maintain it taut and cause it to press firmly against the upper surface of endless belt 22, carried by rollers 23 and 24. An upright frame member 60 is mounted on foundation 10 near the rear portion of the machine, and frame member 60 is provided with an elongated, forwardly extending arm 61, which provides support for the sealing wheel 62. Sealing wheel 62 is keyed to a shaft 63, which is journaled into any conveniently located bearings anchored to the frame structure, preferably arm 61.

Sealing wheel 62 may be provided with a rim 64 formed of nichrome or other electrical resistance material, and electrical current may be passed through the lowermost portion of rim 64. Sealing wheel 62 is so positioned with respect to mandrel 44 that rim 64 presses firmly downward upon the overlapped edges of plastic sheet stock 21 as it passes under wheel 62 during its journey down the length of mandrel 44.

Electrical current, for effecting the desired heat seal of the overlapped edges of sheet 21, may be provided to the lowermost portion of rim 64 by contact brushes 65, mounted in any convenient manner adjacent the lowest portion of wheel 62.

The particular sealing wheel shown on the machine now being described is similar to that disclosed and claimed per se in my co-pending application, Serial No. 67,694, filed December 28, 1948, now Patent No. 2,556,008, June 5, 1951.

Rotary drive is afforded to sealing wheel 62 by a mechanical linkage driven from shaft 30, which, as has been heretofore mentioned, is itself rotated through suitable mechanical coupling by motor 13. Bevel gears 66 and 66a are mounted at the respective ends of shaft 30, and they cooperate respectively with bevel gears 67 and 67a. Bevel gear 67 is keyed to a shaft 68 extending rearwardly along side plate 12; in Fig. 1, housing plate 69 is shown covering shaft 68. On the opposite side of the machine a corresponding shaft 68a extends rearwardly and is covered by a housing plate similar to plate 69. A set of buffer gears 70, near the rear end of shaft 68, couples shaft 68 to a vertical shaft 71, and another pair of bevel gears 72 transmit torque to a horizontally mounted shaft 73. Shaft 73 carries a sprocket 74 which is coupled by a sprocket chain 75 to sprocket 76 on horizontally mounted shaft 77, supported on the superstructure 60. At the forward end of shaft 77 a pair of bevel gears 78 provide coupling to a vertical shaft 79 which, in turning, imparts rotary motion to shaft 63 via bevel gears 80.

Belt 59 is driven in step with reel 62 by a mechanical coupling originating, of course, at motor 13, but derived immediately from shaft 77 via bevel gears 81 and vertical shaft 82. Bevel gears 83 couple shaft 83 to a horizontal shaft 84 which is actually mounted within the interior of mandrel 44, as may be seen in Fig. 6. At its forward end, shaft 84 is provided with a set of bevel gears 85 which couple it to shaft 57 carrying roller 58. On Fig. 4, in order to show clearly the mechanical linkage involved, shaft 84 has been shown as removed a considerable distance to the left of roller 58, although it will be understood that the actual structure is as described and indicated in Fig. 6. Buffer wheel 54, which cooperates with sealing wheel 62, is itself driven by belt 59 in step with wheel 62.

At three different points along the upper surface of mandrel 44, pairs of toed-in rollers are provided to assist the forward motion of the plastic stock and to gently urge the plastic into snug engagement with the mandrel so as to insure proper positioning of the stock. These pairs of rollers are denoted, respectively, 86, 87 and 88. They are mounted on shafts journaled in rotary turrets 90, 91 and 92, and are driven from shafts 68 and 68a, as indicated in Fig. 4.

For the sake of simplicity, only one of the rollers 87 is shown in Fig. 4; the other toed-in rollers are not shown therein, but it will be understood that their manner of drive is identical to that of the roller illustrated. As may be seen from the drawing, the shaft carrying roller 87 is provided with a bevel gear 93 which is driven by a bevel gear 94 keyed to a vertical shaft 95. A pair of bevel gears 96 couple vertical shaft 95 to shaft 68, which is driven by motor 13, as heretofore described. The rollers on the opposite side of the machine are coupled to and driven by shaft 68a in similar manner.

A roller 97, journaled in adjustable bearings 98 carried on side plates 11 and 12, rests over a roller 99, which is driven through suitable mechanical linkage by motor 13. Rollers 97 and 99 pull the plastic material gently forward and facilitate its being rolled into spool formation on spool core 100. Spool core 100 is likewise driven through linkage by motor 13.

Another idler roller 101, is mounted above roller 23 at the extreme forward end of mandrel 44; in fact, as may be seen from Fig. 1, roller 101 is provided with an annular recess at its mid-point to receive the forward tip of mandrel 44.

Operation

It will be noted that with my novel apparatus, and in particular due to the cooperation of the toed-in rollers, endless belt 22, and the endless belt 59 carried within mandrel 44, the plastic stock 21 is carried from the stock spool 14 to the spool 100 which coils up the completed plastic tube without being at any time subjected to internal stresses. The material leaving spool 14 passes over idler elements 20, 19 and 18, and, from the point that it first passes on to endless belt 22, is advanced between the two moving belts 22 and 59. There is no tendency on the part of the toed-in rollers 86, 87 and 88 to pull the plastic out of shape or stretch it because their tendency to urge the plastic on the upper surface of mandrel 44 forward is matched by the corresponding tractive effort of the cooperating belts 59 and 22. At the same time that they urge the plastic sheet forward, the toed-in rollers, which, as may be seen from Fig. 1, are mounted so as to impart a small component of lateral force to the plastic sheets, tend to wrap the plastic sheet snugly around the mandrel and thereby insure that the seam seal formed by sealing roller 62 will form at the correct position.

The magnitude of electrical current supplied to the brushes 65, and the resulting temperature of the lowermost portion of sealing rim 64, may be controlled by a suitable adjustable autotransformer (not shown). It will be understood that the magnitude of such current, and the sealing temperature resulting, will be determined according to the character of the plastic being treated, the thickness of the sheet, and the speed with which the plastic stock is being fed through the machine. I have found from experience that this machine will successfully seal stretchable plastics at a vastly greater speed of stock advance than has ever been obtained to my knowledge with prior-art apparatus.

While I have in the present application described in considerable detail a particular embodiment of my invention, persons skilled in the art will be able to introduce many changes and variations therein without departing from the spirit of my invention. It is accordingly my desire that the scope of this invention be determined primarily with reference to the appended claims.

I claim:

1. In continuous-feed apparatus for making tubes from stretchable plastic sheet stock by guiding the stock around a mandrel to provide lapped edges and forming a continuous seam seal in the lapped edges, the combination of a hollow mandrel provided with movable means mounted therein for continuously advancing the plastic stock by pressing outward on same from within the mandrel, an endless belt mounted for movement below the mandrel adapted to cooperate with said mandrel-contained means by pressing said stock toward the mandrel and urging the same forward during belt movement, a pair of toed-in rollers mounted for pressing on the mandrel on the opposite side thereof from said endless belt, operative when rotated to impart an advancing movement to the plastic stock and at the same time to urge said stock into snug engagement with the mandrel, and driving means for said mandrel-contained means, said endless belt, and said toed-in rollers operative to drive positively all of said elements for advancing said stock over the mandrel while minimizing the creation of internal stresses therein.

2. Apparatus according to claim 1 having a plurality of pairs of said toed-in rollers systematically disposed longitudinally of the mandrel.

KENNETH F. SPALDING.

REFERENCES CITED

The following references are of record in the file of this patent:

UNITED STATES PATENTS

| Number | Name | Date |
| --- | --- | --- |
| 148,280 | Biedinger | Mar. 10, 1874 |
| 556,857 | Madden | Mar. 24, 1896 |
| 969,555 | Neal | Sept. 6, 1910 |
| 2,125,758 | Waters | Aug. 2, 1938 |
| 2,348,196 | Duhaime | May 9, 1944 |